(12) United States Patent
Iizuka et al.

(10) Patent No.: US 10,563,750 B2
(45) Date of Patent: Feb. 18, 2020

(54) POWER TRANSMISSION DEVICE LUBRICATING STRUCTURE AND GASKET

(71) Applicant: Honda Motor Co., Ltd., Tokyo (JP)

(72) Inventors: Natsumi Iizuka, Saitama (JP); Hiroyuki Kita, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/925,776

(22) Filed: Mar. 20, 2018

(65) Prior Publication Data

US 2018/0274658 A1    Sep. 27, 2018

(30) Foreign Application Priority Data

Mar. 21, 2017 (JP) .................... 2017-055170

(51) Int. Cl.
*F16H 57/04* (2010.01)
*F16H 57/029* (2012.01)
*F16H 3/66* (2006.01)

(52) U.S. Cl.
CPC ....... *F16H 57/0409* (2013.01); *F16H 57/029* (2013.01); *F16H 57/0404* (2013.01); *F16H 57/0423* (2013.01); *F16H 57/0443* (2013.01); *F16H 57/0453* (2013.01); *F16H 3/66* (2013.01); *F16H 2200/0069* (2013.01);
(Continued)

(58) Field of Classification Search
CPC ............ F16H 57/0453; F16H 57/0409; F16H 57/0408; F16H 57/0423; F16H 57/0421; F16H 57/0424; F16H 57/042; F16H 57/029; F16H 57/0457; F16H 57/0461; F16H 57/0443; F16H 57/0445; F16H 57/0483; F16H 2057/02047
See application file for complete search history.

(56) References Cited

U.S. PATENT DOCUMENTS 3,800,913 A * 4/1974 Schmitt .................... F01M 1/12
184/6.13
6,299,561 B1 * 10/2001 Kramer ............... F16H 57/0447
184/13.1
(Continued)

FOREIGN PATENT DOCUMENTS

DE     1047820 B  * 12/1958  ......... F16H 57/0447
JP   2008045701 A  *  2/2008  ......... F16H 57/0421
(Continued)

OTHER PUBLICATIONS

EPO Translation of JP 2011027142 A, Kawai, Feb. 10, 2011. (Year: 2018).*
(Continued)

*Primary Examiner* — Daniel D Yabut
(74) *Attorney, Agent, or Firm* — JCIPRNET

(57) ABSTRACT

Provided is a power transmission device lubricating structure capable of preventing air from being mixed with a lubricating fluid while suppressing a resistance applied from the lubricating fluid to a rotation body in a casing. A lubricating structure includes a strainer which includes a suction port and partition members which divide an inner space of a transmission casing. The partition members define a differential room accommodating a final driven gear and a strainer room accommodating the strainer and communicating with the differential room at an upper portion thereof.

4 Claims, 12 Drawing Sheets

(52) U.S. Cl.
CPC .............. *F16H 2200/2012* (2013.01); *F16H 2200/2046* (2013.01); *F16H 2200/2048* (2013.01); *F16H 2200/2066* (2013.01); *F16H 2200/2082* (2013.01)

(56) References Cited

U.S. PATENT DOCUMENTS

| | | | | |
|---|---|---|---|---|
| 8,746,405 | B2 * | 6/2014 | Perakes | F16H 57/0409 |
| | | | | 184/6.12 |
| 9,920,828 | B2 * | 3/2018 | Fast | F16H 57/0412 |
| 2006/0054410 | A1 * | 3/2006 | Nakamura | F16H 57/0447 |
| | | | | 184/6.12 |
| 2010/0029430 | A1 * | 2/2010 | Tokai | F16H 57/0447 |
| | | | | 475/160 |
| 2014/0353087 | A1 * | 12/2014 | Craft | F16H 57/0453 |
| | | | | 184/6.27 |
| 2015/0075322 | A1 * | 3/2015 | Vituri | F16H 57/029 |
| | | | | 74/606 R |
| 2018/0045295 | A1 * | 2/2018 | Kiyokami | F16H 57/0453 |

FOREIGN PATENT DOCUMENTS

| | | | |
|---|---|---|---|
| JP | 2009264393 | | 11/2009 |
| JP | 2010-242829 | | 10/2010 |
| JP | 2011027142 A | * | 2/2011 |
| JP | 2014119084 | | 6/2014 |

OTHER PUBLICATIONS

EPO Translation of the Description of DE 1047820 B, Lammerz, Dec. 31, 1958. (Year: 2019).*

"Office Action of Japan Counterpart Application", dated Sep. 11, 2018, with English translation thereof, p. 1-p. 5.

* cited by examiner

|      | C1 | C2 | C3  | B1 | B2  | B3 | F1  | GEAR RATIO | COMMON RATIO |
|------|----|----|-----|----|-----|----|-----|-----------|--------------|
| Rvs  |    |    | ○   |    | ○   |    | L   | 4.008     |              |
| 1st  |    |    |     | ○  | (○) |    | R/L | 5.233     | 1.554        |
| 2nd  |    | ○  |     | ○  | ○   |    | R   | 3.367     | 1.465        |
| 3rd  |    |    | ○   | ○  | ○   |    | R   | 2.298     | 1.348        |
| 4th  |    | ○  | ○   | ○  |     |    | R   | 1.705     | 1.251        |
| 5th  | ○  |    | (○) | ○  |     |    | R   | 1.363     | 1.363        |
| 6th  | ○  | ○  | ○   |    |     |    | R   | 1.000     | 1.273        |
| 7th  | ○  |    | ○   |    | ○   |    | R   | 0.786     | 1.196        |
| 8th  | ○  | ○  |     |    | ○   |    | R   | 0.657     | 1.126        |
| 9th  | ○  |    |     |    | ○   | ○  | R   | 0.584     | 1.120        |
| 10th | ○  | ○  |     |    |     | ○  | R   | 0.520     |              |

FIG. 4

POWER TRANSMISSION DEVICE LUBRICATING STRUCTURE AND GASKET

CROSS-REFERENCE TO RELATED APPLICATION

This application claims the priority benefit of Japan application serial no. 2017-055170, filed on Mar. 21, 2017. The entirety of the above-mentioned patent application is hereby incorporated by reference herein and made a part of this specification.

BACKGROUND

Technical Field

The disclosure relates to a power transmission device lubricating structure which lubricates a rotation body by immersing the rotation body in a fluid reservoir formed by a lubricating fluid accumulated in a casing of a power transmission device.

Description of Related Art

Hitherto, as a power transmission device mounted on a vehicle or the like, a power transmission device including a transmission shifting and outputting driving power of an internal-combustion engine, a differential device distributing the driving power output from the transmission to left and right drive wheels, and a transfer device distributing the driving power transmitted to the differential device to other drive wheels located in the longitudinal direction have been known.

As such a power transmission device, there is known a power transmission device having a lubricating structure for lubricating a final driven gear (a rotation body) by immersing the final driven gear in an oil reservoir (a fluid reservoir) formed by a lubricating oil (a lubricating fluid) accumulated in a casing (for example, see Patent Document 1: Japanese Unexamined Patent Application Laid-Open Publication No. 2010-242829).

In such a power transmission device, the lubricating oil accumulated in the casing is generally sucked by a pump through a strainer and supplied to components of the power transmission device as lubricating oil or used for hydraulic pressure of a hydraulic operation device.

Here, when the pump sucks air from the oil reservoir together with the lubricating oil, a requested operation hydraulic pressure will not be able to be supplied. For that reason, the arrangement position of the strainer or the amount of the lubricating oil is set so that a suction port of the strainer is immersed in the oil reservoir at all times.

SUMMARY

However, in the lubricating structure disclosed in Patent Document 1, when the amount of the lubricating fluid of the fluid reservoir is too large, resistance will be applied from the lubricating fluid to the rotation body and get bigger when the lubricating fluid is raised by the rotation body.

Meanwhile, when the amount of the lubricating fluid of the fluid reservoir is decreased in order to reduce the resistance applied to the rotation body, the suction port of the strainer is exposed and the strainer sucks air together with the lubricating fluid. Therefore, air will be mixed with the lubricating fluid supplied to other mechanisms through the strainer.

The embodiments of the invention provide a power transmission device lubricating structure and a gasket capable of preventing a suction port of a strainer from being exposed from a fluid reservoir while suppressing a resistance applied from a lubricating fluid to a rotation body in a casing.

According to an aspect of the invention, there is provided a power transmission device lubricating structure lubricating a rotation body by immersing the rotation body (which is, for example, a final driven gear 42 in the embodiment and is the same in the following description) in a fluid reservoir formed by a lubricating fluid accumulated in a casing (which is, for example, a transmission casing 31 in the embodiment and is the same in the following description) of a power transmission device (which is, for example, a power transmission device PT in the embodiment and is the same in the following description), including: a strainer (which is, for example, a strainer 65 in the embodiment and is the same in the following description) which is provided in the casing; and a partition member (which is, for example, a protrusion portion 63*a* and a wall portion 64*b* in the embodiment and is the same in the following description) that divides an inner space of the casing, wherein the strainer includes a suction port (which is, for example, a suction port 65*a* in the embodiment and is the same in the following description) which sucks the lubricating fluid from the fluid reservoir, and wherein the partition member divides the inner space of the casing to define a first room (which is, for example, a differential room DR in the embodiment and is the same in the following description) accommodating the rotation body and a second room (which is, for example, a strainer room SR in the embodiment and is the same in the following description) accommodating the strainer and communicating with the first room at an upper portion thereof.

In this way, in the lubricating structure of one or some exemplary embodiments of the invention, the inner space of the casing is divided into the first room and the second room by the partition member. That is, the fluid reservoir formed in the casing can also be divided into a fluid reservoir on the side of the first room and a fluid reservoir on the side of the second room.

Accordingly, the lubricating fluid which is raised by the rotation of the rotation body is limited to the lubricating fluid of the fluid reservoir on the side of the first room. Then, the raised lubricating fluid is also supplied to the second room through the communication portion rather than staying only in the first room. Then, the lubricating fluid supplied to the second room stays in the second room due to the partition member. As a result, the liquid level of the fluid reservoir of the first room is decreased and the liquid level of the fluid reservoir of the second room is increased compared to a case in which the partition member is not provided.

Thus, according to the lubricating structure of one or some exemplary embodiments of the invention, since the liquid level of the fluid reservoir of the first room is decreased, an immersed portion of the rotation body is reduced. Accordingly, it is possible to suppress resistance applied from the lubricating fluid to the rotation body when the lubricating fluid is raised from the fluid reservoir.

Further, since the liquid level of the fluid reservoir of the second room is kept high, it is possible to prevent the suction port of the strainer from being exposed from the fluid reservoir.

Further, in the lubricating structure of one or some exemplary embodiments of the invention, the casing may include a plurality of casing members (which are, for example, a TC-side casing member 61 and a TM-side casing member 62 in the embodiment and are the same in the following description) connected to each other at opening edges thereof, a gasket (which is, for example, a gasket 63 and is the same in the following description) may be sandwiched between the casing members, the gasket may include a protrusion portion (which is, for example, a protrusion portion 63a in the embodiment and is the same in the following description) protruding toward the inside of the casing, and the partition member may be formed by using the protrusion portion.

When the partition member is formed by using the protrusion portion of the gasket (for example, only by the protrusion portion or a combination of the protrusion portion and other members), the partition member can be fixed at the same time at which the gasket is attached and only the process of fixing the partition member can be omitted. Accordingly, it is possible to easily form the first room and the second room.

According to an aspect of the invention, there is provided a gasket sandwiched between casing members of a casing accommodating a strainer and a rotation body of a power transmission device and including the casing members connected to each other at opening edges thereof. When the gasket is sandwiched between the casing members, the gasket includes a protrusion portion which protrudes toward the inside of the casing to define a first room and a second room an inner space of the casing, the first room accommodates the rotation body, and the second room accommodates the strainer and communicates with the first room at an upper portion thereof.

When the casing is formed by using the gasket with such a configuration, the first room and the second room communicating with the first room at the upper portion thereof are automatically formed in the casing. Accordingly, the liquid level of the fluid reservoir of the first room is decreased in the casing formed by using the gasket compared to a case in which the partition member is not provided and the liquid level of the fluid reservoir of the second room is increased compared to a case in which the partition member is not provided.

Thus, according to the lubricating structure formed by using the gasket of one or some exemplary embodiments of the invention, since the liquid level of the fluid reservoir of the first room is decreased, an immersed portion of the rotation body is reduced. Accordingly, it is possible to suppress resistance applied from the lubricating fluid to the rotation body in a rotation state when the lubricating fluid is raised from the fluid reservoir. Further, since the liquid level of the fluid reservoir of the second room is kept high, it is possible to prevent the suction port of the strainer from being exposed from the fluid reservoir.

BRIEF DESCRIPTION OF THE DRAWINGS

FIG. 4 is an explanatory diagram showing an engagement state of each engagement mechanism at each gear of the transmission of FIG. 2.

FIG. 12 A and FIG. 12 B are explanatory diagrams showing an oil level of an oil reservoir in the transmission casing of FIG. 5, where

DESCRIPTION OF THE EMBODIMENTS

Hereinafter, a vehicle equipped with a power transmission device having a lubricating structure according to some embodiments will be described with reference to the drawings.

Figure 1:
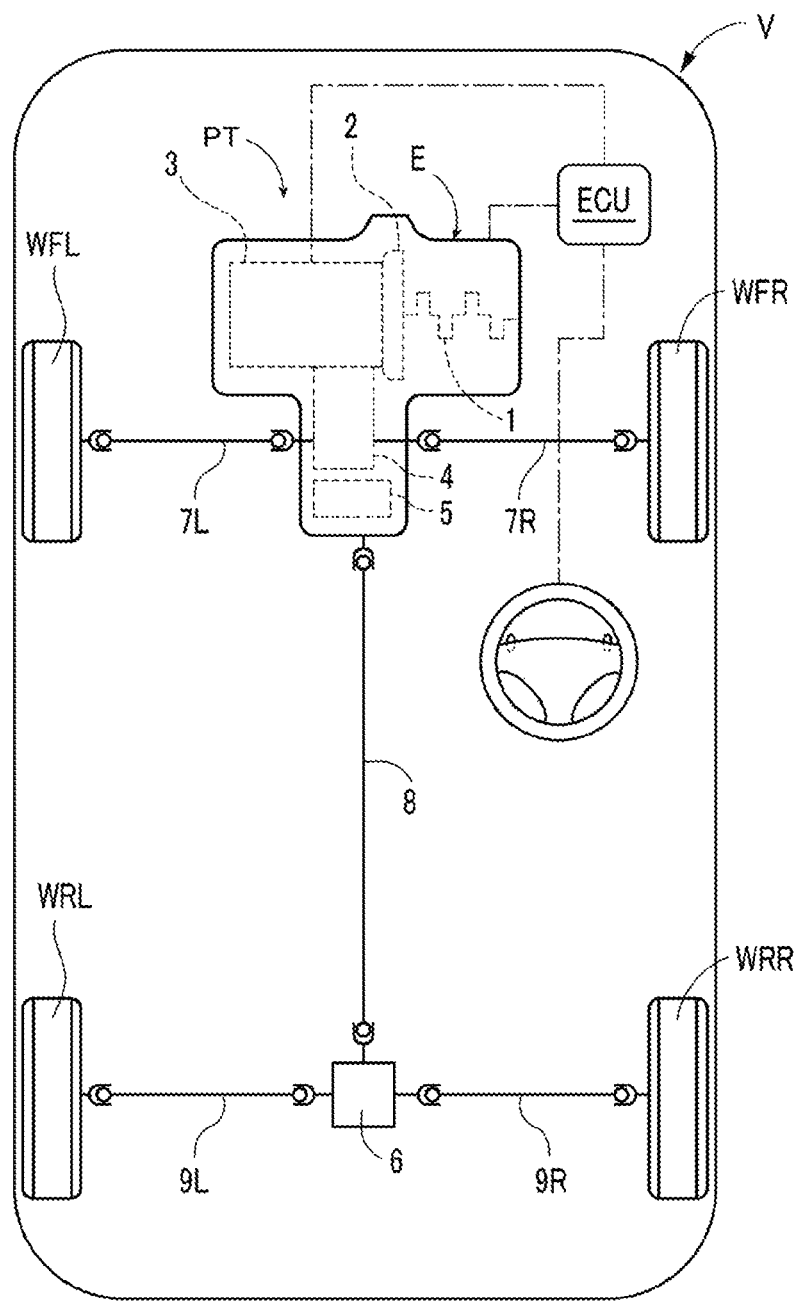
FIG. 1 is an explanatory diagram schematically showing a vehicle equipped with a power transmission device having a lubricating structure according to an embodiment.

As shown in FIG. 1, an engine E (an internal-combustion engine, a driving source) is transversely mounted on a vehicle body of a vehicle V so that a crank shaft 1 is aligned in a horizontal direction of the vehicle body. The driving power of the engine E is transmitted to a left front wheel WFL, a right front wheel WFR, a left rear wheel WRL, and a right rear wheel WRR through a power transmission device PT.

The power transmission device PT includes a torque converter 2 which is connected to the crank shaft 1, a transmission 3 which is connected to the torque converter 2, a front differential gear 4 (a differential device) which is connected to the transmission 3, a transfer device 5 which is connected to the front differential gear 4, and a rear differential gear 6 which is connected to the transfer device 5.

The front differential gear 4 is connected to the left front wheel WFL and the right front wheel WFR through a front left axle 7L and a front right axle 7R. The rear differential gear 6 is connected to the transfer device 5 through a propeller shaft 8 and is connected to the left rear wheel WRL and the right rear wheel WRR through a rear left axle 9L and a rear right axle 9R.

Figure 2:
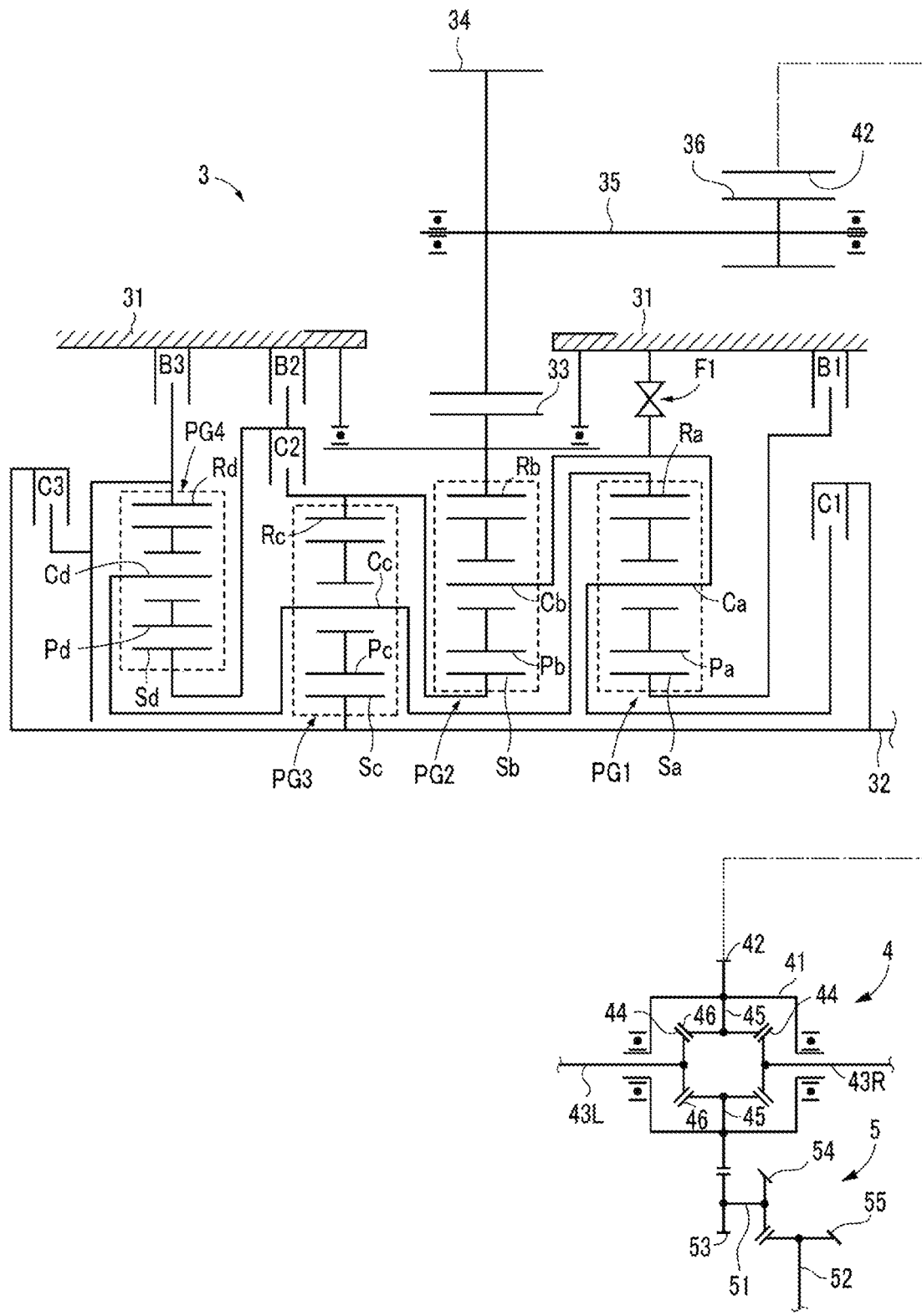
FIG. 2 is a skeleton diagram showing a transmission mounted on the vehicle of FIG. 1.

As shown in a skeleton diagram of FIG. 2, the transmission 3 includes an input shaft 32 which is axially supported in a transmission casing 31 (a casing) to be rotatable and an output member 33 that is configured as an output gear disposed coaxially with the input shaft 32.

The driving power output from the engine E is transmitted to the input shaft 32 through the torque converter 2 including a lock-up clutch and a damper.

The rotation of the output member 33 is transmitted to the left front wheel WFL and the right front wheel WFR (see FIG. 1) through an idle gear 34 meshing with the output member 33, an idle shaft 35 axially supporting the idle gear 34, a final drive gear 36 axially supported by the idle shaft 35, and a final driven gear 42 (that is, the front differential gear 4) meshing with the final drive gear 36.

Additionally, a single-disc or multi-disc type starting clutch performing a free friction engagement may be provided in the power transmission device PT instead of the torque converter 2.

Inside the transmission casing 31, a first planetary gear mechanism PG1, a second planetary gear mechanism PG2, a third planetary gear mechanism PG3, and a fourth planetary gear mechanism PG4 are disposed coaxially with the input shaft 32 in order from the engine E.

The third planetary gear mechanism PG3 is configured as a so-called single pinion type planetary gear mechanism including components such as a sun gear Sc, a ring gear Rc, and a carrier Cc axially supporting a pinion Pc meshing with the sun gear Sc and the ring gear Rc to be rotatable and revolvable.

The so-called single pinion type planetary gear mechanism is also called a minus planetary gear mechanism or a negative planetary gear mechanism since the ring gear rotates in a different direction from the sun gear when the carrier is fixed and the sun gear is rotated. Additionally, in the so-called single pinion type planetary gear mechanism, the carrier rotates in the same direction as the sun gear when the ring gear is fixed and the sun gear is rotated.

Figure 3:
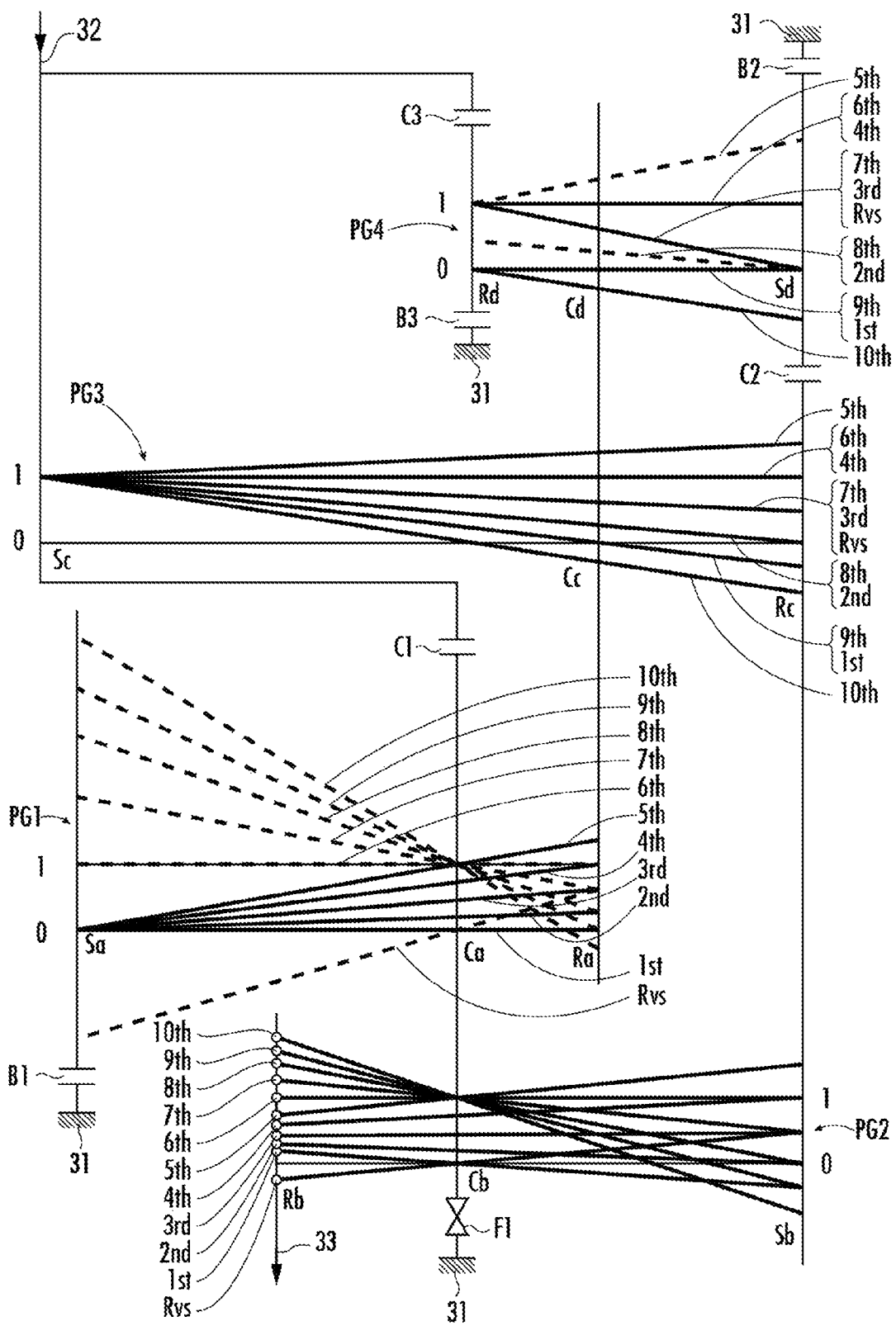
FIG. 3 is a nomogram of a planetary gear mechanism of the transmission of FIG. 2.

The nomogram shown in the second row from above in FIG. 3 (a diagram showing a ratio among the relative rotation speeds of three components of the sun gear, the carrier, and the ring gear as a line (a speed line)) is the nomogram of the third planetary gear mechanism PG3. As shown in the nomogram, when the sun gear Sc, the carrier Cc, and the ring gear Rc corresponding to three components of the third planetary gear mechanism PG3 are respectively set as a first component, a second component, and a third component sequentially arranged from the left at intervals corresponding to the gear ratio (the number of teeth of the ring gear/the number of teeth of the sun gear) of the nomogram, the first component is the sun gear Sc, the second component is the carrier Cc, and the third component is the ring gear Rc.

Here, a ratio between a gap from the sun gear Sc to the carrier Cc and a gap from the carrier Cc to the ring gear Rc is set to h:1 as a gear ratio h of the third planetary gear mechanism PG3. Additionally, in the nomogram, the lower horizontal line and the upper horizontal line (lines overlapping the fourth and sixth lines) respectively indicate states in which the rotation speed is "0" and "1" (the same rotation speed as the input shaft 32).

The fourth planetary gear mechanism PG4 is also configured as a so-called single pinion type planetary gear mechanism including components such as a sun gear Sd, a ring gear Rd, and a carrier Cd axially supporting a pinion Pd meshing with the sun gear Sd and the ring gear Rd to be rotatable and revolvable.

The nomogram shown in the first row (the highest row) from above in FIG. 3 is the nomogram of the fourth planetary gear mechanism PG4. As shown in the nomogram, when the sun gear Sd, the carrier Cd, and the ring gear Rd corresponding to three components of the fourth planetary gear mechanism PG4 are respectively set as a fourth component, a fifth component, and a sixth component sequentially arranged from the left at intervals corresponding to the gear ratio of the nomogram, the fourth component is the ring gear Rd, the fifth component is the carrier Cd, and the sixth component is the sun gear Sd.

Here, a ratio between a gap from the sun gear Sd to the carrier Cd and a gap from the carrier Cd to the ring gear Rd is set to i:1 as a gear ratio i of the fourth planetary gear mechanism PG4.

The first planetary gear mechanism PG1 is also configured as a so-called single pinion type planetary gear mechanism including components such as a sun gear Sa, a ring gear Ra, and a carrier Ca axially supporting a pinion Pa meshing with the sun gear Sa and the ring gear Ra to be rotatable and revolvable.

The nomogram shown in the third row from above in FIG. 3 is the nomogram of the first planetary gear mechanism PG1. As shown in the nomogram, when the sun gear Sa, the carrier Ca, and the ring gear Ra corresponding to three components of the first planetary gear mechanism PG1 are respectively set as a seventh component, an eighth component, and a ninth component sequentially arranged from the left at intervals corresponding to the gear ratio of the nomogram, the seventh component is the sun gear Sa, the eighth component is the carrier Ca, and the ninth component is the ring gear Ra.

Here, a ratio between a gap from the sun gear Sa to the carrier Ca and a gap from the carrier Ca to the ring gear Ra is set to j:1 as a gear ratio j of the first planetary gear mechanism PG1.

The second planetary gear mechanism PG2 is also configured as a so-called single pinion type planetary gear mechanism including components such as a sun gear Sb, a ring gear Rb, and a carrier Cb axially supporting a pinion Pb meshing with the sun gear Sb and the ring gear Rb to be rotatable and revolvable.

The nomogram shown in the fourth row (the lowest row) from above in FIG. 3 is the nomogram of the second planetary gear mechanism PG2. As shown in the nomogram, when the sun gear Sb, the carrier Cb, and the ring gear Rb corresponding to three components of the second planetary gear mechanism PG2 are respectively set as a tenth component, an eleventh component, and a twelfth component sequentially arranged from the left at intervals corresponding to the gear ratio of the nomogram, the tenth component is the ring gear Rb, the eleventh component is the carrier Cb, and the twelfth component is the sun gear Sb.

Here, a ratio between a gap from the sun gear Sb to the carrier Cb and a gap from the carrier Cb to the ring gear Rb is set to k:1 as a gear ratio k of the second planetary gear mechanism PG2.

The sun gear Sc (the first component) of the third planetary gear mechanism PG3 is connected to the input shaft 32. Further, the ring gear Rb (the tenth component) of the second planetary gear mechanism PG2 is connected to the output member 33 configured as an output gear.

Further, the carrier Cc (the second component) of the third planetary gear mechanism PG3, the carrier Cd (the fifth component) of the fourth planetary gear mechanism PG4, and the ring gear Ra (the ninth component) of the first planetary gear mechanism PG1 are connected to one another to obtain a first connection body Cc-Cd-Ra.

Further, the ring gear Rc (the third component) of the third planetary gear mechanism PG3 and the sun gear Sb (the twelfth component) of the second planetary gear mechanism PG2 are connected to each other to obtain a second connection body Rc-Sb.

Further, the carrier Ca (the eighth component) of the first planetary gear mechanism PG1 and the carrier Cb (the eleventh component) of the second planetary gear mechanism PG2 are connected to each other to obtain a third connection body Ca-Cb.

Further, the transmission 3 includes seven engagement mechanisms including three clutches which are the first clutch C1, the second clutch C2, and the third clutch C3, three brakes which are the first brake B1, the second brake B2, and the third brake B3, and one two-way clutch F1.

The first clutch C1 is a hydraulic operation type wet multi-disc clutch. By the first clutch C1, the third planetary gear mechanism PG3 is switchable between a connected state in which the sun gear Sc (the first component) is connected to the third connection body Ca-Cb and a released state in which the connection is released.

The third clutch C3 is a hydraulic operation type wet multi-disc clutch. By the third clutch C3, the third planetary gear mechanism PG3 is switchable between a connected state in which the sun gear Sc (the first component) is connected to the ring gear Rd (the fourth component) of the fourth planetary gear mechanism PG4 and a released state in which the connection is released.

The second clutch C2 is a hydraulic operation type wet multi-disc clutch. By the second clutch C2, the fourth planetary gear mechanism PG4 is switchable between a connected state in which the sun gear Sd (the sixth component) is connected to the second connection body Rc-Sb and a released state in which the connection is released.

The two-way clutch F1 also serves as a fourth brake B4. The two-way clutch F1 allows normal rotation of the third connection body Ca-Cb (rotation in the same direction as the rotation direction of the input shaft 32 and the output member 33) and is switchable between a reverse rotation prohibited state in which reverse rotation is prohibited and a fixed state in which the third connection body Ca-Cb is fixed to the transmission casing 31.

If a force causing rotation in the normal rotation direction is applied to the third connection body Ca-Cb when the two-way clutch F1 is in the reverse rotation prohibited state, the rotation is allowed and the released state is set. Meanwhile, when a force causing rotation in the reverse rotation direction is applied to the third connection body, the rotation is prohibited and the fixed state in which the third connection body is fixed to the transmission casing 31 is set.

The first brake B1 is a hydraulic operation type wet multi-disc brake. By the first brake B1, the first planetary gear mechanism PG1 is switchable between a fixed state in which the sun gear Sa (the seventh component) is fixed to the transmission casing 31 and a released state in which the fixing is released.

The second brake B2 is a hydraulic operation type wet multi-disc brake. By the second brake B2, the fourth planetary gear mechanism PG4 is switchable between a fixed state in which the sun gear Sd (the sixth component) is fixed to the transmission casing 31 and a released state in which the fixing is released.

The third brake B3 is a hydraulic operation type wet multi-disc brake. By the third brake B3, the fourth planetary gear mechanism PG4 is switchable between a fixed state in which the ring gear Rd (the fourth component) is fixed to the transmission casing 31 and a released state in which the fixing is released.

The switching of three clutches including the first clutch C1, the second clutch C2, and the third clutch C3, three brakes including the first brake B1, the second brake B2, and the third brake B3, and one two-way clutch F1 is controlled by the transmission control device ECU (see FIG. 1) configured as the transmission control unit (TCU) based on vehicle information such as a travel speed of the vehicle V transmitted from a general control unit (not shown).

The transmission control device ECU is configured as an electronic unit including a CPU or a memory (not shown). The transmission control device ECU controls the transmission 3 by receiving predetermined vehicle information such as a travel speed or an accelerator opening degree of the vehicle V, a rotation speed or an output torque of the engine E, and operation information of a paddle shift lever and executing a control program stored in a storage device such as a memory by a CPU.

In the transmission 3, the first clutch C1, the first planetary gear mechanism PG1, the second planetary gear mechanism PG2, the third planetary gear mechanism PG3, the second clutch C2, the fourth planetary gear mechanism PG4, and the third clutch C3 are sequentially disposed on the axis of the input shaft 32 from the side of the engine E and the torque converter 2.

Then, the third brake B3 is disposed at the outside of the fourth planetary gear mechanism PG4 in the radial direction, the second brake B2 is disposed at the outside of the second clutch C2 in the radial direction, the first brake B1 is disposed at the outside of the first clutch C1 in the radial direction, and the two-way clutch F1 is disposed at the outside of the first planetary gear mechanism PG1 in the radial direction.

For that reason, in the transmission 3, the first brake B1, the second brake B2, and the third brake B3, and the two-way clutch F1 are disposed at the outside of the planetary gear mechanism or the clutch in the radial direction. Accordingly, the axial length of the transmission 3 is shortened compared to a case in which the first brake B1, the second brake B2, the third brake B3, and the two-way clutch F1 are arranged on the axis of the input shaft 32 along with the planetary gear mechanism.

In addition, even when the third brake B3 is disposed at the outside of the third clutch C3 in the radial direction and the second brake B2 is disposed at the outside of the fourth planetary gear mechanism PG4 in the radial direction, the axial length can be shortened similarly.

Here, a case of establishing each gear of the transmission 3 of the embodiment will be described with reference to FIGS. 3 and 4.

In addition, a speed line indicated by the dashed line in FIG. 3 shows a state in which the components of other planetary gear mechanisms rotate (idly rotate) to follow the planetary gear mechanism transmitting power among the first planetary gear mechanism PG1, the second planetary gear mechanism PG2, the third planetary gear mechanism PG3, and the fourth planetary gear mechanism PG4.

FIG. 4 is a diagram showing the states of three clutches including the first clutch C1, the second clutch C2, and the third clutch C3, three brakes including the first brake B1, the second brake B2, and the third brake B3, and one two-way clutch F1 at each of gears to be described later.

In this drawing, "O" in the columns of the first clutch C1, the second clutch C2, the third clutch C3, the first brake B1, the second brake B2, and the third brake B3 indicates the connected state or the fixed state and the blank indicates the released state. Further, "R" in the column of the two-way clutch F1 indicates the reverse rotation prohibited state and "L" indicates the fixed state.

Further, the underlined "R" and "L" indicate a state in which the rotation speed of the third connection body Ca-Cb becomes "0" by the function of the two-way clutch F1. Further, "R/L" indicates "R" in the reverse rotation prohibited state in a normal case, but indicates "L" in the fixed state when an engine brake is effective.

Further, FIG. 4 shows a common ratio (a ratio between the gear ratios at the gears and a value obtained by dividing a gear ratio at a predetermined gear by a gear ratio of a gear one stage higher than the predetermined gear) and a gear ratio (the rotation speed of the input shaft 32/the rotation speed of the output member 33) at each gear when the gear ratio h of the third planetary gear mechanism PG3 is set to 2.734, the gear ratio i of the fourth planetary gear mechanism PG4 is set to 1.614, the gear ratio j of the first planetary gear mechanism PG1 is set to 2.681, and the gear ratio k of the second planetary gear mechanism PG2 is set to 1.914. According to this drawing, it can be seen that the common ratio can be appropriately set.

In order to establish the first-speed gear position, the two-way clutch F1 is set to the reverse rotation prohibited state (R of FIG. 4) and the first brake B1 and the second brake B2 are set to the fixed state.

When the two-way clutch F1 is set to the reverse rotation prohibited state (R) and the first brake B1 is set to the fixed state, the reverse rotation of the third connection body Ca-Cb and the sun gear Sa (the seventh component) of the first planetary gear mechanism PG1 is prohibited and the rotation speed of the third connection body Ca-Cb and the sun gear Sa (the seventh component) of the first planetary gear mechanism PG1 becomes "0."

Accordingly, the sun gear Sa (the seventh component), the carrier Ca (the eighth component), and the ring gear Ra (the ninth component) of the first planetary gear mechanism PG1 are locked so as not to be relatively rotatable and the rotation speed of the first connection body Cc-Cd-Ra including the ring gear Ra (the ninth component) of the first planetary gear mechanism PG1 also becomes "0."

Then, the rotation speed of the ring gear Rb (the tenth component) of the second planetary gear mechanism PG2 connected to the output member 33 is set to "1st" shown in FIG. 3 and a first-speed gear position is established.

Additionally, it is possible to establish the first-speed gear position without setting the second brake B2 to the fixed state. However, it is fixed to the first-speed gear position so that the first-speed gear position is smoothly shifted to the second-speed gear position to be described later. Further, when an engine brake is applied at the first-speed gear position, the two-way clutch F1 may be switched from the reverse rotation prohibited state (R) to the fixed state (L).

In order to establish the second-speed gear position, the two-way clutch F1 is set to the reverse rotation prohibited state (R), the first brake B1 and the second brake B2 are set to the fixed state, and the second clutch C2 is set to the connected state.

Since the two-way clutch F1 is set to the reverse rotation prohibited state, the normal rotation of the third connection body Ca-Cb is allowed. Further, since the first brake B1 is set to the fixed state, the rotation speed of the sun gear Sa (the seventh component) of the first planetary gear mechanism PG1 becomes "0." Further, since the second brake B2 is set to the fixed state, the rotation speed of the sun gear Sd (the sixth component) of the fourth planetary gear mechanism PG4 becomes "0."

Further, since the second clutch C2 is set to the connected state, the rotation speed of the second connection body Rc-Sb becomes "0" which is the same speed as the rotation speed of the sun gear Sd (the sixth component) of the fourth planetary gear mechanism PG4.

Then, the rotation speed of the ring gear Rb (the tenth component) of the second planetary gear mechanism PG2 connected to the output member 33 is set to "2nd" shown in FIG. 3 and a second-speed gear position is established.

In order to establish the third-speed gear position, the two-way clutch F1 is set to the reverse rotation prohibited state, the first brake B1 and the second brake B2 are set to the fixed state, and the third clutch C3 is set to the connected state.

Since the two-way clutch F1 is set to the reverse rotation prohibited state, the normal rotation of the third connection body Ca-Cb is allowed. Further, since the first brake B1 is set to the fixed state, the rotation speed of the sun gear Sa (the seventh component) of the first planetary gear mechanism PG1 becomes "0." Further, since the second brake B2 is set to the fixed state, the rotation speed of the sun gear Sd (the sixth component) of the fourth planetary gear mechanism PG4 becomes "0."

Further, since the third clutch C3 is set to the connected state, the rotation speed of the ring gear Rd (the fourth component) of the fourth planetary gear mechanism PG4 becomes "1" which is the same speed as the rotation speed of the sun gear Sc (the first component) of the third planetary gear mechanism PG3 connected to the input shaft 32.

Accordingly, since the rotation speed of the sun gear Sd (the sixth component) of the fourth planetary gear mechanism PG4 becomes "0" and the rotation speed of the ring gear Rd (the fourth component) becomes "1," the rotation speed of the carrier Cd (the fifth component), that is, the rotation speed of the first connection body Cc-Cd-Ra, becomes i/(i+1).

Then, the rotation speed of the ring gear Rb (the tenth component) of the second planetary gear mechanism PG2 connected to the output member 33 is set to "3rd" shown in FIG. 3 and a third-speed gear position is established.

In order to establish the fourth-speed gear position, the two-way clutch F1 is set to the reverse rotation prohibited state, the first brake B1 is set to the fixed state, and the second clutch C2 and the third clutch C3 are set to the connected state.

Since the two-way clutch F1 is set to the reverse rotation prohibited state, the normal rotation of the third connection body Ca-Cb is allowed. Further, since the first brake B1 is set to the fixed state, the rotation speed of the sun gear Sa (the seventh component) of the first planetary gear mechanism PG1 becomes "0."

Further, since the second clutch C2 is set to the connected state, the sun gear Sd (the sixth component) of the fourth planetary gear mechanism PG4 and the second connection body Rc-Sb rotate at the same speed. Accordingly, between the third planetary gear mechanism PG3 and the fourth planetary gear mechanism PG4, the carrier Cc (the second component) and the carrier Cd (the fifth component) are connected to each other and the ring gear Rc (the third component) and the sun gear Sd (the sixth component) are connected to each other. For that reason, in the fourth-speed gear position in which the second clutch C2 is set to the connected state, one nomogram including four components can be drawn by the third planetary gear mechanism PG3 and the fourth planetary gear mechanism PG4.

Further, since the third clutch C3 is set to the connected state, the rotation speed of the ring gear Rd (the fourth component) of the fourth planetary gear mechanism PG4 becomes "1" which is the same speed as the rotation speed of the sun gear Sc (the first component) of the third planetary gear mechanism PG3 and the rotation speeds of two components among four components including the third planetary gear mechanism PG3 and the fourth planetary gear mechanism PG4 become the same speed "1".

Accordingly, the components of the third planetary gear mechanism PG3 and the fourth planetary gear mechanism PG4 are locked so as not to be relatively rotatable and the rotation speed of all components of the third planetary gear mechanism PG3 and the fourth planetary gear mechanism PG4 becomes "1". Further, the rotation speed of the third connection body Ca-Cb becomes j/(j+1).

Then, the rotation speed of the ring gear Rb (the tenth component) of the second planetary gear mechanism PG2 connected to the output member 33 is set to "4 th" shown in FIG. 3 and a fourth-speed gear position is established.

In order to establish the fifth-speed gear position, the two-way clutch F1 is set in the reverse rotation prohibiting state, the first brake B1 is set in the fixing state, and the first clutch C1 and the third clutch C3 are set in the connecting state.

Since the two-way clutch F1 is set in the reverse rotation prohibiting state, the normal rotation of the third connection body Ca-Cb is allowed. Further, since the first brake B1 is set in the fixing state, the rotation speed of the sun gear Sa (the seventh component) of the first planetary gear mechanism PG1 becomes "0".

Further, since the first clutch C1 is set in the connecting state, the rotation speed of the third connection body Ca-Cb becomes "1" which is the same speed as the rotation speed of the sun gear Sc (the first component) of the third planetary gear mechanism PG3.

Then, the rotation speed of the ring gear Rb (the tenth component) of the second planetary gear mechanism PG2 connected to the output member 33 is set to "5 th" shown in FIG. 3 and a fifth-speed gear position is established.

Additionally, it is possible to establish the fifth-speed gear position without setting the third clutch C3 in the connecting state. However, since the third clutch C3 is set in the connecting state in the fourth-speed gear position and the sixth-speed gear position to be described later, the third clutch is also in the connecting state in the fifth-speed gear position in order to smoothly perform the downshift from the fifth-speed gear position to the fourth-speed gear position and the upshift from the fifth-speed gear position to the sixth-speed gear position to be described later.

In order to establish the sixth-speed gear position, the two-way clutch F1 is set in the reverse rotation prohibiting state and the first clutch C1, the second clutch C2, and the third clutch C3 are set in the connecting state.

Since the two-way clutch F1 is set in the reverse rotation prohibiting state, the normal rotation of the third connection body Ca-Cb is allowed.

Further, since the second clutch C2 and the third clutch C3 are set in the connecting state, the components of the third planetary gear mechanism PG3 and the fourth planetary gear mechanism PG4 are set so as not to be relatively rotatable as described in the description of the fourth-speed gear position and the rotation speed of the second connection body Rc-Sb becomes "1". Further, since the first clutch C1 is set in the connecting state, the rotation speed of the third connection body Ca-Cb is set to "1".

Accordingly, in the second planetary gear mechanism PG2, the carrier Cb (the eleventh component) and the sun gear Sb (the twelfth component) are set to the same speed of "1" so that the components are locked so as not to be relatively rotatable.

Then, the rotation speed of the ring gear Rb (the tenth component) of the second planetary gear mechanism PG2 connected to the output member 33 is set to "1" of "6 th" shown in FIG. 3 and a sixth-speed gear position is established.

In order to establish the seventh-speed gear position, the two-way clutch F1 is set in the reverse rotation prohibiting state, the second brake B2 is set in the fixing state, and the first clutch C1 and the third clutch C3 are set in the connecting state.

Since the two-way clutch F1 is set in the reverse rotation prohibiting state, the normal rotation of the third connection body Ca-Cb is allowed. Further, since the second brake B2 is set in the fixing state, the rotation speed of the sun gear Sd (the sixth component) of the fourth planetary gear mechanism PG4 becomes "0".

Further, since the third clutch C3 is set in the connecting state, the rotation speed of the ring gear Rd (the fourth component) of the fourth planetary gear mechanism PG4 becomes "1" which is the same speed as the rotation speed of the sun gear Sc (the first component) of the third planetary gear mechanism PG3 and the rotation speed of the first connection body Cc-Cd-Ra including the carrier Cd (the fifth component) of the fourth planetary gear mechanism PG4 becomes i(i+1). Further, since the first clutch C1 is set in the connecting state, the rotation speed of the third connection body Ca-Cb becomes "1" which is the same speed as the rotation speed of the sun gear Sc (the first component) of the third planetary gear mechanism PG3 connected to the input shaft 32.

Then, the rotation speed of the ring gear Rb (the tenth component) of the second planetary gear mechanism PG2 connected to the output member 33 is set to "7 th" shown in FIG. 3 and a seventh-speed gear position is established.

In order to establish the eighth-speed gear position, the two-way clutch F1 is set in the reverse rotation prohibiting state, the second brake B2 is set in the fixing state, and the first clutch C1 and the second clutch C2 are set in the connecting state.

Since the two-way clutch F1 is set in the reverse rotation prohibiting state, the normal rotation of the third connection body Ca-Cb is allowed. Further, since the second brake B2 is set in the fixing state, the rotation speed of the sun gear Sd (the sixth component) of the fourth planetary gear mechanism PG4 becomes "0".

Further, since the second clutch C2 is set in the connecting state, the rotation speed of the second connection body Rc-Sb becomes "0" which is the same speed as the rotation speed of the sun gear Sd (the sixth component) of the fourth planetary gear mechanism PG4. Further, since the first clutch C1 is set in the connecting state, the rotation speed of the third connection body Ca-Cb becomes "1" which is the same speed as the rotation speed of the sun gear Sc (the first component) of the third planetary gear mechanism PG3.

Then, the rotation speed of the ring gear Rb (the tenth component) of the second planetary gear mechanism PG2 connected to the output member 33 is set to "8 th" shown in FIG. 3 and an eighth-speed gear position is established.

In order to establish the ninth-speed gear position, the two-way clutch F1 is set in the reverse rotation prohibiting state, the second brake B2 and the third brake B3 are set in the fixing state, and the first clutch C1 is set in the connecting state.

Since the two-way clutch F1 is set in the reverse rotation prohibiting state, the noinial rotation of the third connection body Ca-Cb is allowed. Further, since the second brake B2 is set in the fixing state, the rotation speed of the sun gear Sd (the sixth component) of the fourth planetary gear mechanism PG4 becomes "0". Further, since the third brake B3 is set in the fixing state, the rotation speed of the ring gear Rd (the fourth component) of the fourth planetary gear mechanism PG4 also becomes "0".

Accordingly, the sun gear Sd (the sixth component), the carrier Cd (the fifth component), and the ring gear Rd (the fourth component) of the fourth planetary gear mechanism PG4 are locked so as not to be relatively rotatable and the rotation speed of the first connection body Cc-Cd-Ra including the carrier Cd (the fifth component) of the fourth planetary gear mechanism PG4 also becomes "0".

Further, since the first clutch C1 is set in the connecting state, the rotation speed of the third connection body Ca-Cb becomes "1" which is the same speed as the rotation speed of the sun gear Sc (the first component) of the third planetary gear mechanism PG3.

Then, the rotation speed of the ring gear Rb (the tenth component) of the second planetary gear mechanism PG2 connected to the output member 33 is set to "9 th" shown in FIG. 3 and a ninth-speed gear position is established.

In order to establish the tenth-speed gear position, the two-way clutch F1 is set in the reverse rotation prohibiting state, the third brake B3 is set in the fixing state, and the first clutch C1 and the second clutch C2 are set in the connecting state.

Since the two-way clutch F1 is set in the reverse rotation prohibiting state, the normal rotation of the third connection body Ca-Cb is allowed. Further, since the third brake B3 is set in the fixing state, the rotation speed of the ring gear Rd (the fourth component) of the fourth planetary gear mechanism PG4 becomes "0".

Further, since the second clutch C2 is set in the connecting state, the second connection body Rc-Sb and the sun gear Sd (the sixth component) of the fourth planetary gear mechanism PG4 rotate at the same speed. Further, since the first clutch C1 is set in the connecting state, the rotation speed of the third connection body Ca-Cb becomes "1" which is the same speed as the rotation speed of the sun gear Sc (the first component) of the third planetary gear mechanism PG3.

Then, the rotation speed of the ring gear Rb (the tenth component) of the second planetary gear mechanism PG2 connected to the output member 33 is set to "10 th" shown in FIG. 3 and a tenth-speed gear position is established.

In order to establish the reverse gear, the one-way clutch F1 is set in the fixing state (L of FIG. 4), the second brake B2 is set in the fixing state, and the third clutch C3 is set in the connecting state.

Since the second brake B2 is set in the fixing state and the third clutch C3 is set in the connecting state, the rotation speed of the first connection body Cc-Cd-Ra becomes i(i+1). Further, since the two-way clutch F1 is set in the fixing state, the rotation speed of the third connection body Ca-Cb becomes "0".

Then, the rotation speed of the ring gear Rb (the tenth component) of the second planetary gear mechanism PG2 connected to the output member 33 is set to the reverse rotation "Rvs" shown in FIG. 3 and a reverse gear position is established.

Figure 5:
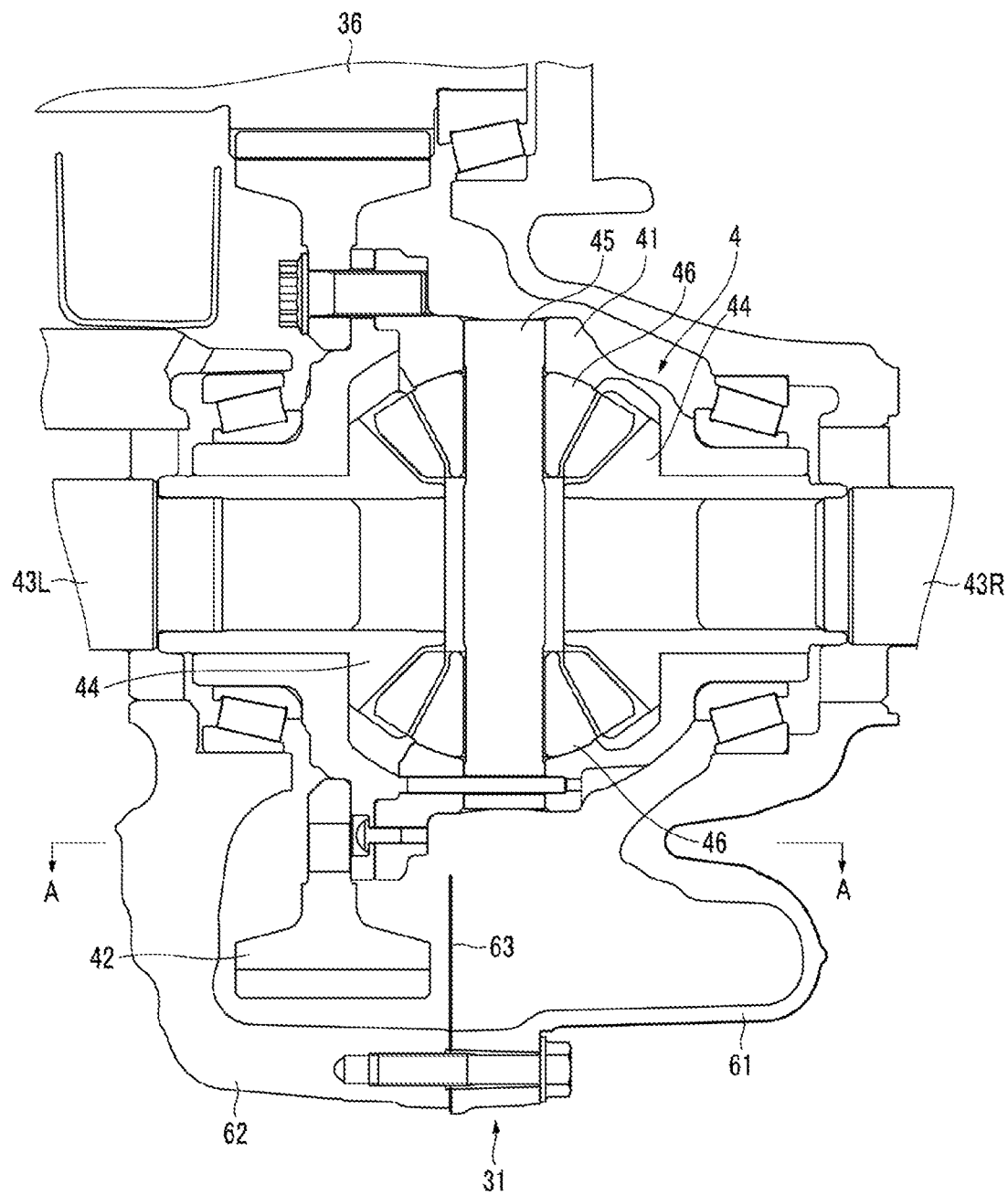
FIG. 5 is a front view showing a main part of a transmission casing of the power transmission device of FIG. 1 as a cross-section.

Returning to FIG. 2, the front differential gear 4 includes a differential casing 41 which is rotatably supported by the transmission casing 31 of the transmission 3 (see FIG. 5). The final driven gear 42 meshing with the final drive gear 36 provided in the idle shaft 35 is fixed to the outer periphery of the differential casing 41.

The rotation of the idle shaft 35 of the transmission 3 is transmitted to the differential casing 41 through the final drive gear 36 and the final driven gear 42. The rotation of the differential casing 41 is transmitted to the front left axle 7L and the front right axle 7R in response to the load of the left front wheel WFL and the right front wheel WFR.

A front left output shaft 43L connected to the front left axle 7L and a front right output shaft 43R connected to the front right axle 7R are fitted to the differential casing 41 to be relatively rotatable. The differential side gear 44 is spline-connected to each of facing ends of the front left output shaft 43L and the front right output shaft 43R.

A pinion shaft 45 is fixed into the differential casing 41 so as to be orthogonal to the front left output shaft 43L and the front right output shaft 43R. A pair of pinion gears 46 respectively meshing with two differential side gears 44 is rotatably supported by the pinion shaft 45.

The transfer device 5 includes a transfer input shaft 51 to which the driving power is transmitted from the final driven gear 42 of the front differential gear 4 and a transfer output shaft 52 to which the driving power is transmitted from the transfer input shaft 51 so that the driving power is transmitted to the propeller shaft 8.

A transfer input gear 53 meshing with the final driven gear 42 is spline-fitted to an end portion on the side of the front differential gear 4 in the transfer input shaft 51 to be axially supported thereto. An opposite end portion of the transfer input shaft 51 is provided with a first bevel gear 54 which is a helical gear.

An end portion (a front end) on the side of the transfer input shaft 51 in the transfer output shaft 52 is provided with a second bevel gear 55 which is a helical gear. Meanwhile, an end portion of the propeller shaft 8 is coupled to a rear end of the transfer output shaft 52.

When the first bevel gear 54 meshes with the second bevel gear 55, the rotation of the transfer input shaft 51 is transmitted to the propeller shaft 8 (see FIG. 1) through the transfer output shaft 52.

Next, the transmission casing 31 (the casing) and the lubricating structure provided therein will be described with reference to FIGS. 5 to 12A, 12B.

The lubricating structure is used to lubricate the final driven gear 42 by immersing the final driven gear 42 (the rotation body) into the oil reservoir (the fluid reservoir) formed by the lubricating oil (the lubricating fluid) accumulated in the transmission casing 31 and to lubricate other mechanisms stored in the transmission casing 31 by raising the lubricating oil from the oil reservoir with the rotation of the final driven gear 42.

First, a configuration of the lubricating structure will be described with reference to FIGS. 5 to 10.

As shown in FIG. 5, the transmission casing 31 is formed by engaging a TC-side casing member 61 and a TM-side casing member 62 with each other at the opening edges. Further, a gasket 63 is sandwiched between the opening edge of the TC-side casing member 61 and the opening edge of the TM-side casing member 62 in order to prevent the leakage of the lubricating oil therein.

Figure 6:
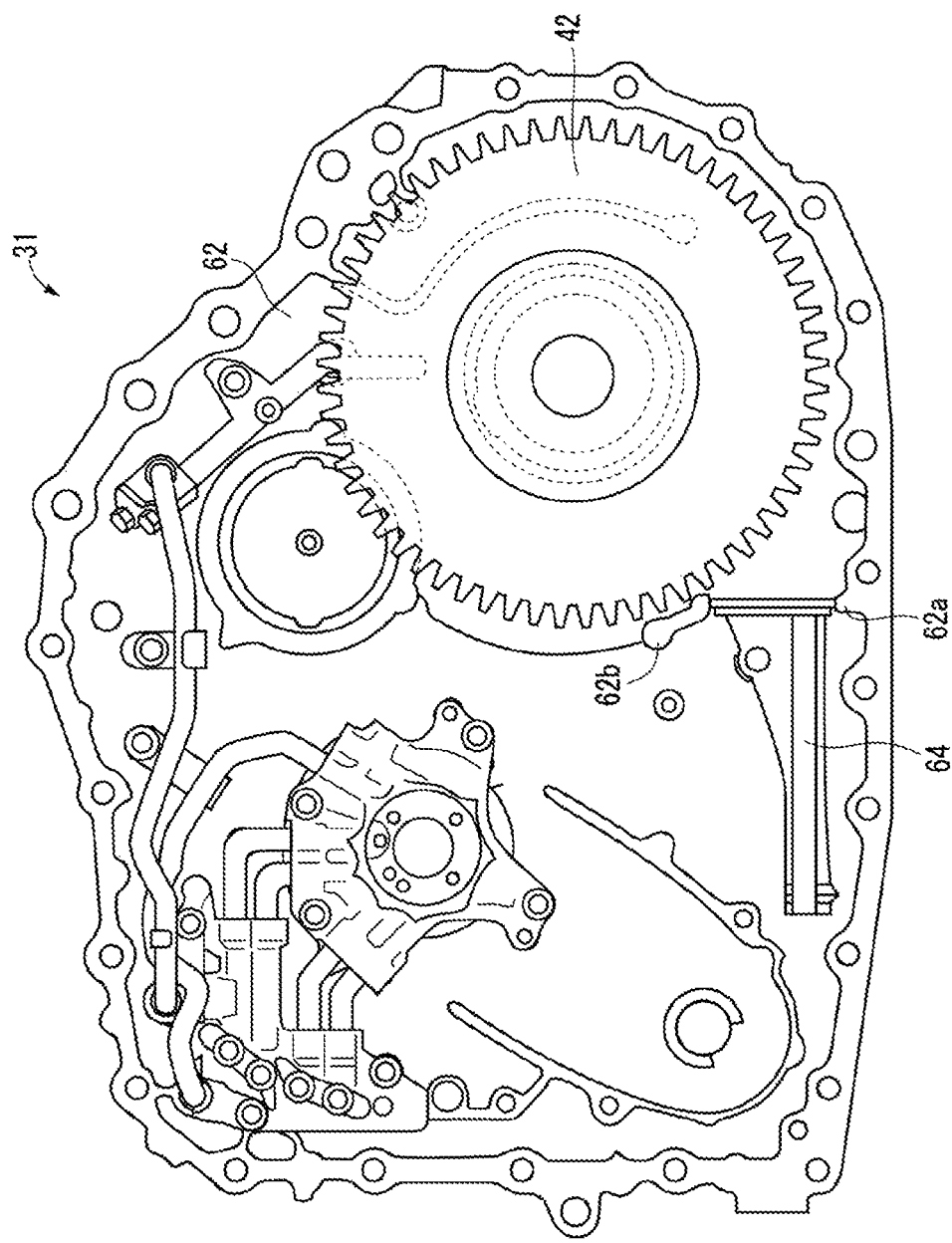
FIG. 6 is a side view showing a position of a duct with respect to a TM-side casing member of the transmission casing of FIG. 5.

As shown in FIG. 6, a duct 64 is disposed at a position separated from the final driven gear 42 (that is, a position at the front side in the traveling direction of the vehicle V) in a direction intersecting the rotation center axis of the final driven gear 42 on the side of the TM-side casing member 62 in the lower inner space of the transmission casing 31.

Figure 7:
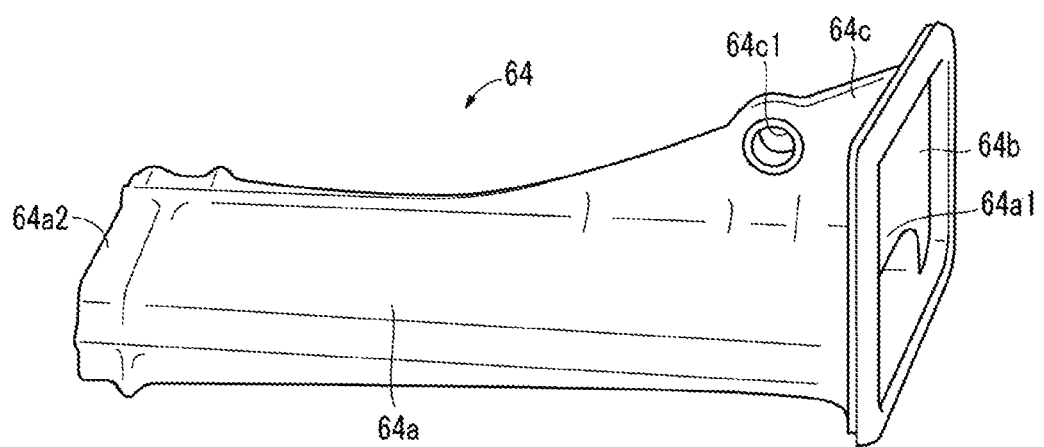
FIG. 7 is a perspective view showing the duct of FIG. 6.

As shown in FIG. 7, the duct 64 includes a cylindrical body 64a, a wall portion 64b which is widened in the radial direction from an edge (a first opening portion 64a1) of one opening portion of the main body 64a, and a support portion 64c which is uprightly formed in the peripheral surface of the main body 64a and the wall portion 64b to support the wall portion 64b. The support portion 64c is provided with a bolt hole 64c1 for fixing the duct 64 to the TM-side casing member 62 by a bolt.

Returning to FIG. 6, the duct 64 is disposed so that the axis of the main body 64a follows the traveling direction of the vehicle V. The TM-side casing member 62 includes a first partition wall rib 62a which protrudes toward the duct 64 at the lower position of the wall portion 64b when the duct 64 is attached and a second partition wall rib 62b which protrudes toward the duct 64 at the upper position thereof.

Figure 9:
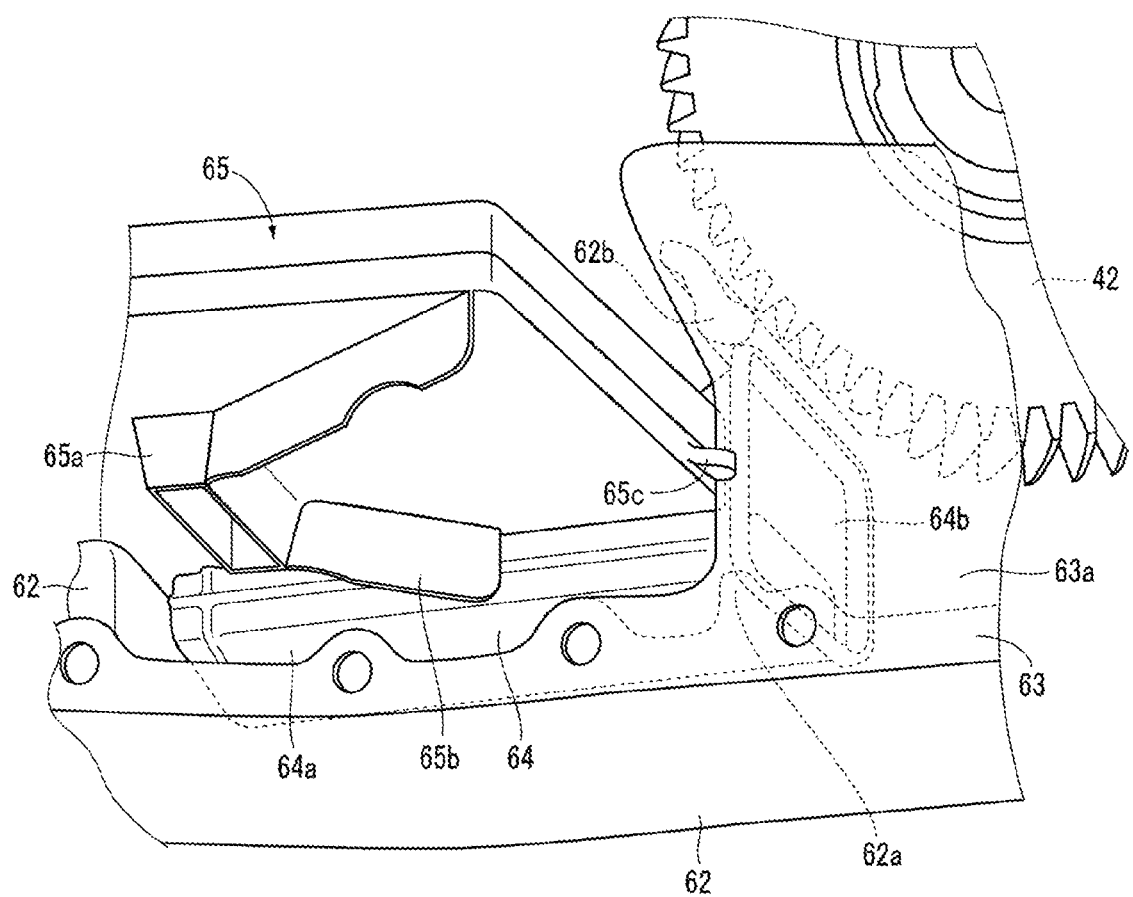
FIG. 9 is a perspective view showing a positional relation between the duct and the strainer of the transmission casing of FIG. 5 when viewed from below.
Figure 10:
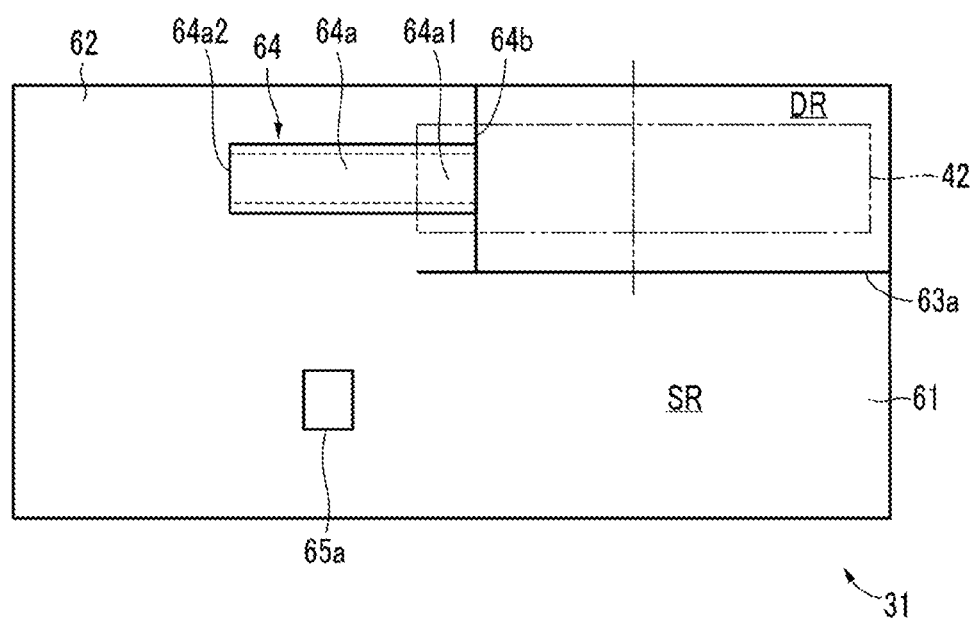
FIG. 10 is a schematic cross-sectional view taken along a line A-A and showing positions of a differential room and a strainer room of the transmission casing of FIG. 5.

Accordingly, when the duct 64 is attached to the TM-side casing member 62, a partition wall which is a part of the partition member is formed by the wall portion 64b of the duct 64, the first partition wall rib 62a, and the second partition wall rib 62b (see FIGS. 9 and 10).

Figure 8:
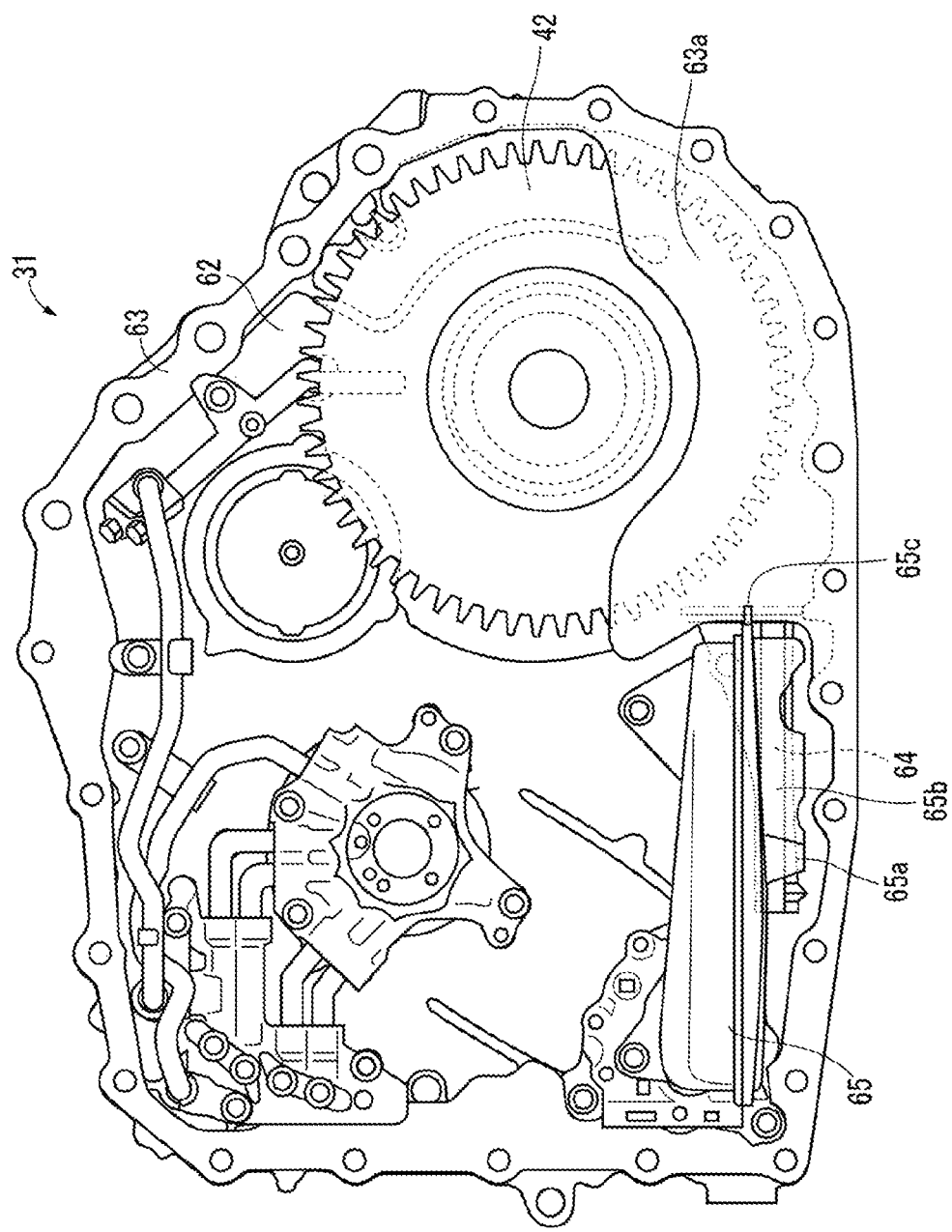
FIG. 8 is a side view showing positions of a gasket and a strainer with respect to the TM-side casing member of the transmission casing.

As shown in FIG. 8, a strainer 65 is disposed at the side position of the duct 64 on the side of the TC-side casing member 61 in relation to the duct 64 and the gasket 63 (that is, the end surface of the TM-side casing member 62) in the lower inner space of the transmission casing 31.

As shown in FIG. 9, the strainer 65 includes a suction port 65a which is formed at a center portion of the lower surface thereof to suck the lubricating oil from the oil reservoir. A pump (not shown) sucks the lubricating oil from the oil reservoir through the suction port 65a of the strainer 65 and supplies the lubricating oil to various mechanisms.

Further, the strainer 65 includes a first protrusion 65b which is continuously formed from the suction port 65a and a second protrusion 65c which is provided at the end surface on the side of the final driven gear 42.

The first protrusion 65b is formed as a pair of wall portions widened in a U-shape toward the final driven gear 42 from both sides of the suction port 65a. When the lubricating oil moves forward as in the case of braking the vehicle V (see FIG. 12B), the lubricating oil is efficiently accumulated in the vicinity of the suction port 65a by the first protrusion 65b.

When the strainer 65 is attached to the TM-side casing member 62, the wall portion on the side of the TM-side casing member 62 among the pair of wall portions of the first protrusion 65b directly comes into contact with the main body 64a of the duct 64 from the TC-side casing member 61 and the second protrusion 65c indirectly comes into contact with the edge portion of the wall portion 64b of the duct 64 through a protrusion portion 63a of the gasket 63 to be described later from the TC-side casing member 61.

The duct 64 is fixed to the TM-side casing member 62 through the bolt hole 64c1 by a bolt and the strainer 65 is fixed to the TM-side casing member 62 by the contact from the TC-side casing member 61.

Returning to FIG. 8, the gasket 63 includes the protrusion portion 63a which is formed at the side position of the final driven gear 42 to protrude toward the inside of the transmission casing 31. The protrusion portion 63a covers the lower area in relation to the rotation center axis of the final driven gear 42 in the side view (see FIG. 8 and the like).

A portion close to the rotation center axis of the final driven gear 42 in the protrusion portion 63a (an upper portion in relation to the wall portion 64b of the duct 64) is formed in a shape widened upward to protrude toward the main body 64a (that is, the strainer 65) in relation to the wall portion 64b of the duct 64.

Further, the protrusion portion 63a is sandwiched by the second protrusion 65c of the strainer 65, the edge of the wall portion 64b of the duct 64, and the first partition wall rib 62a and the second partition wall rib 62b of the TM-side casing member 62 (see FIG. 9).

In the lubricating structure with such a configuration, the partition member is formed by the combination of the protrusion portion 63a of the gasket 63, the wall portion 64b of the duct 64, and the first partition wall rib 62a and the second partition wall rib 62b of the TM-side casing member 62. Then, two spaces are defined at the lower side of the transmission casing 31 by the partition member.

Specifically, as shown in FIG. 10, a differential room DR (a first room) having a substantially rectangular shape in the plan view and accommodating the final driven gear 42 and a strainer room SR (a second room) having a substantially L-shape in the plan view, accommodating the strainer 65, and communicating with the differential room DR at the upper inner space of the transmission casing 31 (see FIG. 11) are defined at the lower inner space of the transmission casing 31 by the partition member including the protrusion portion 63a, the wall portion 64b, and the first partition wall rib 62a and the second partition wall rib 62b of the TM-side casing member 62.

Additionally, in FIG. 10, only the protrusion portion 63a of the gasket 63 is described to help the comprehension and the boundary between the TC-side casing member 61 and the TM-side casing member 62 is not shown. Further, only the suction port 65a of the strainer 65 is described.

The differential room DR and the strainer room SR communicate with each other by the cylindrical body 64a of the duct 64. An opening portion (a second opening portion 64a2) on the side of the strainer room SR in the main body 64a is located at a position separated from the differential room DR in the longitudinal direction of the vehicle V (the horizontal direction in FIG. 10) in relation to the suction port 65a of the strainer 65.

Next, a flow of the lubricating oil in the lubricating structure will be described with reference to FIGS. 11 and 12A, 12B. In addition, an arrow in FIGS. 11 and 12A, 12B indicates a direction in which the lubricating oil flows. Further, in FIG. 11, a two-dotted chain line having a large gap indicates the height of the oil level of the oil reservoir for the lubricating oil in the differential room DR and a two-dotted chain line having a small gap indicates the height of the oil level of the oil reservoir for the lubricating oil in the strainer room SR. Further, in FIG. 12A and FIG. 12B, a hatched region schematically indicates the position of the oil reservoir at each of the differential room and the strainer room.

Figure 11:
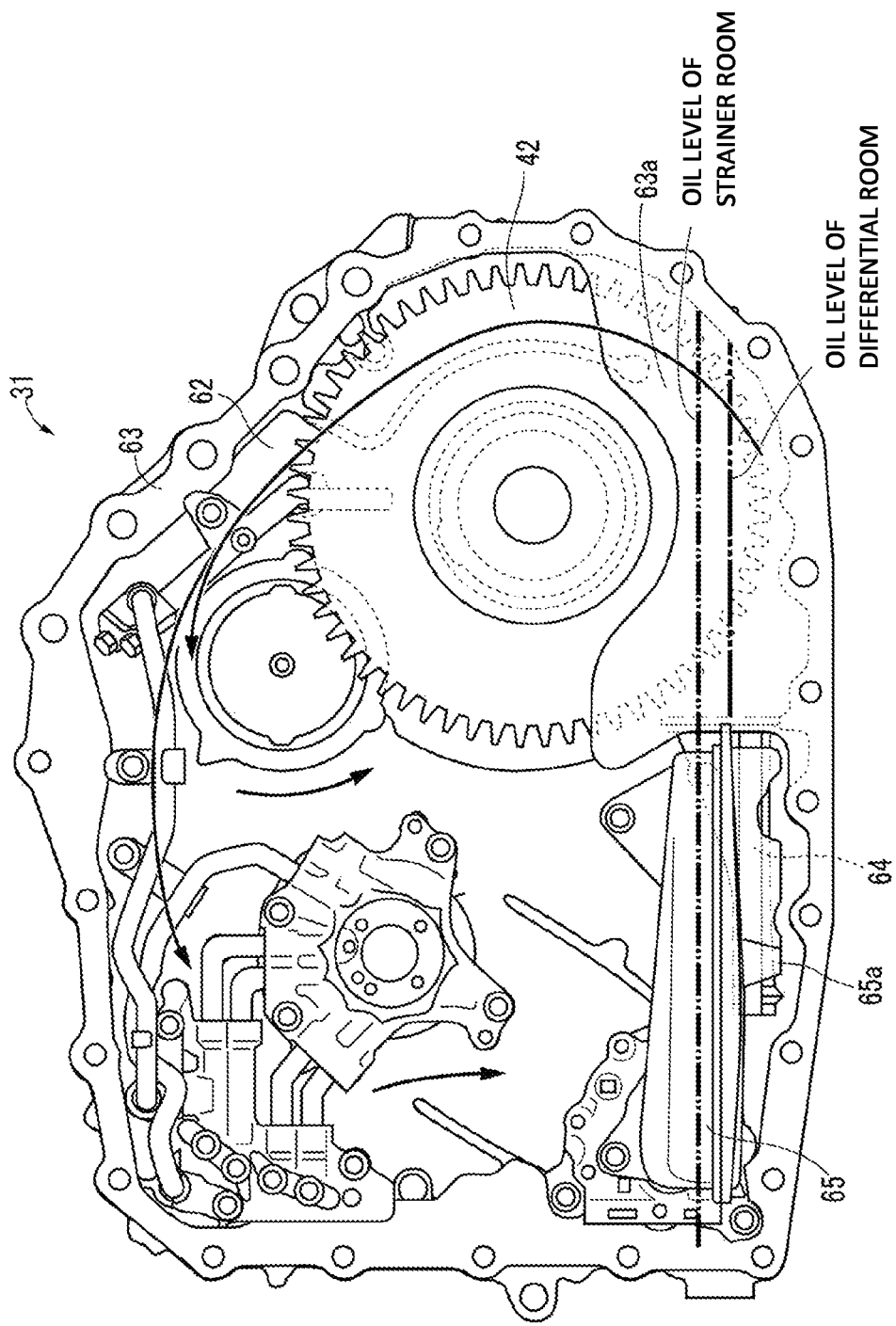
FIG. 11 is a side view showing a flow of lubricating oil in the transmission casing of FIG. 5.

As shown in FIG. 11, the lubricating oil supplied into the transmission casing 31 is accumulated in the lower inner space of the transmission casing 31 to thereby form the oil reservoir.

A lower portion of the final driven gear 42 is immersed into the oil reservoir formed in the differential room DR in the oil reservoir. For that reason, the final driven gear 42 is lubricated by the lubricating oil in the oil reservoir. Further, the lubricating oil of the oil reservoir is raised upward to be scattered in the transmission casing 31 with the rotation of the final driven gear 42.

The scattered lubricating oil flows downward while lubricating various mechanisms accommodated in the transmission casing 31. At this time, since the differential room DR and the strainer room SR communicate with each other at the upper inner space of the transmission casing 31, the lubricating oil which flows downward flows without distinction of the differential room DR and the strainer room SR.

Next, the further movement of the lubricating oil supplied to the strainer room SR is limited by the partition member including the protrusion portion 63a of the gasket 63, the wall portion 64b of the duct 64, and the first partition wall rib 62a and the second partition wall rib 62b of the TM-side casing member 62. As a result, most of the lubricating oil raised from the oil reservoir of the differential room DR by the final driven gear 42 and moving downward in the transmission casing 31 stays in the strainer room SR.

Accordingly, the oil level (in FIG. 11, a height indicated by a two-dotted chain line having a large gap) of the oil reservoir of the differential room DR is decreased compared to a case where the partition member is not provided. Meanwhile, the oil level (in FIG. 11, a two-dotted chain line having a small gap) of the oil reservoir of the strainer room SR is increased compared to a case where the partition member is not provided.

Thus, according to the lubricating structure provided in the transmission casing 31, it is possible to suppress a resistance caused by the lubricating oil during the rotation of the final driven gear 42 for raising the lubricating oil from the oil reservoir by lowering the oil level of the oil reservoir of the differential room DR so that a portion of the final driven gear 42 immersed into the oil is reduced.

Further, according to the above-described lubricating structure, since the oil level of the oil reservoir of the strainer room SR is kept to be high in a normal case, the suction port 65a of the strainer 65 is not easily exposed. Accordingly, air is not easily mixed with the lubricating oil sucked from the suction port 65a by the strainer 65.

Incidentally, in the above-described lubricating structure, the oil level of the oil reservoir in the transmission casing 31 largely changes when the vehicle V equipped with the power transmission device PT having the lubricating structure is largely accelerated or a large braking force is applied to the vehicle V (that is, in a case other than a normal case).

However, in the above-described lubricating structure, since the exposure of the suction port 65a of the strainer 65 is prevented even when such a change in oil level occurs, air is not easily mixed with the lubricating oil sucked from the suction port 65a by the strainer 65.

In the above-described lubricating structure, the differential room DR and the strainer room SR communicate with each other by the duct 64 and the suction port 65a of the strainer 65 is located on the side of the differential room DR in relation to the front end portion (that is, the second opening portion 64a2 which is the opening portion on the side of the strainer room SR) of the duct 64. Then, the extension direction of the cylindrical body 64a of the duct 64 matches the traveling direction of the vehicle V.

Figure 12A:
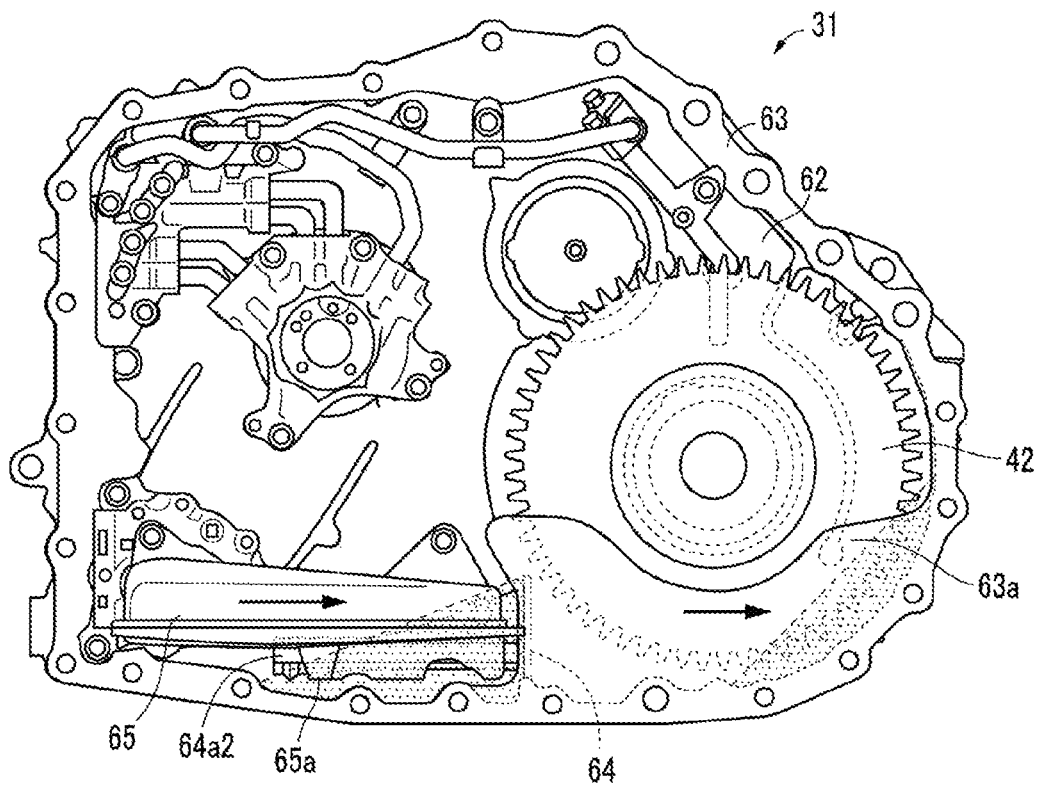
FIG. 12A shows an accelerating state and FIG. 12B shows a braking state.

For that reason, as shown in FIG. 12A, when the lubricating oil of the oil reservoir in the transmission casing 31 is largely moved backward due to a large acceleration applied to the vehicle V (for example, when the vehicle V is largely accelerated), the second opening portion 64a2 of the duct 64 is exposed at an early timing. That is, the movement of the lubricating oil from the strainer room SR toward the differential room DR through the duct 64 is limited at an early timing.

As a result, the lubricating oil is accumulated in the rear portion (that is, a portion in which the suction port 65a of the strainer 65 is located) in relation to the front end portion of the duct 64 in the strainer room SR. Accordingly, the depth of the oil reservoir of the strainer room SR is maintained and the exposure of the suction port 65a of the strainer 65 is prevented.

Figure 12B:
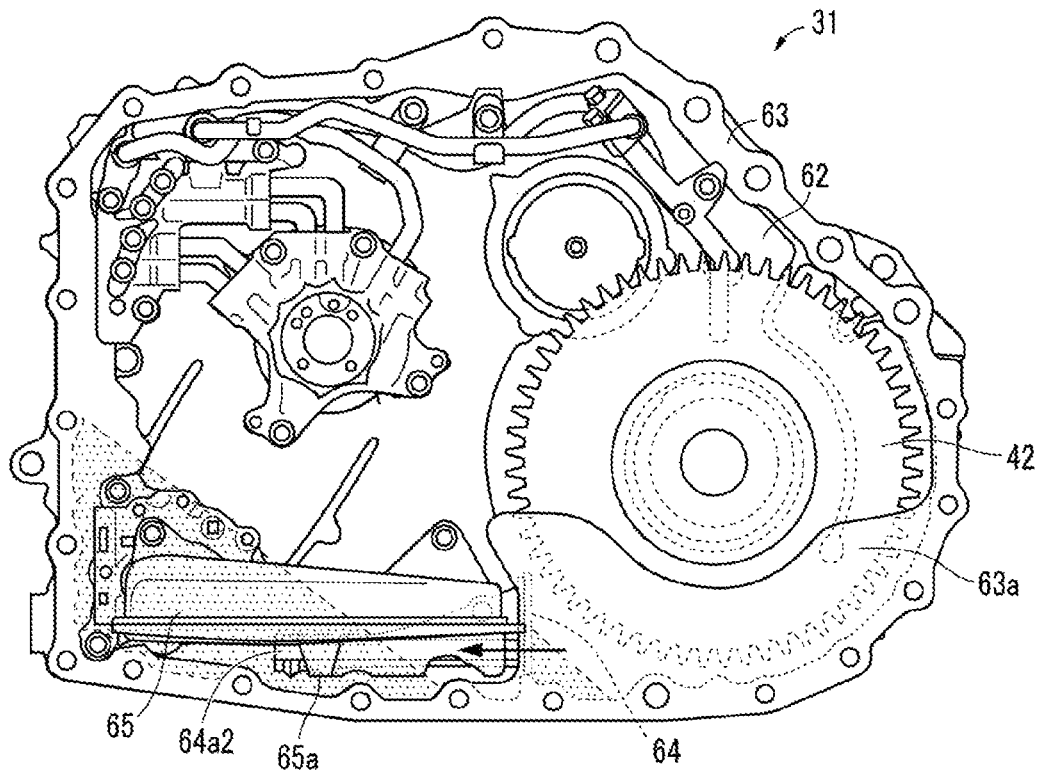

Meanwhile, as shown in FIG. 12B, when the lubricating oil of the oil reservoir of the transmission casing largely moves forward due to a large braking force applied to the vehicle V (for example, when the vehicle V is suddenly braked), the movement of the lubricating oil from the differential room DR to the strainer room SR is smoothly performed without the influence of the position of the second opening portion 64a2 of the duct 64.

As a result, the lubricating oil of the oil reservoir of the differential room DR flows into the strainer room SR and a deep oil reservoir is formed by a large amount of the lubricating oil. Accordingly, the exposure of the suction port 65a of the strainer 65 is prevented.

Thus, according to the lubricating structure provided in the transmission casing 31, since the oil level of the oil reservoir of the strainer room SR is kept to be high in a normal case, the movement of the lubricating oil from the strainer room SR to the differential room DR is limited when the lubricating oil moves backward, and the movement of the lubricating oil from the differential room DR to the strainer room S is smoothly performed when the lubricating oil moves forward. Accordingly, since the suction port 65a of the strainer 65 is not easily exposed, air is not easily mixed with the lubricating oil supplied from the strainer 65 to other mechanisms.

While the embodiment has been described with reference to the drawings, the invention is not limited to the embodiment.

For example, in the above-described embodiment, the transmission casing 31 includes the TC-side casing member 61 and the TM-side casing member 62 which are connected to each other at the opening edges thereof.

However, the casing of the embodiments of the invention is not limited to such a configuration and any configuration of connecting the plurality of casing members at the opening edges thereof may be used. For example, three or more casing members may be connected to each other at the opening edges thereof.

Further, in the above-described embodiment, the final driven gear 42 is used as the rotation body for raising the lubricating oil from the oil reservoir of the differential room DR. However, the rotation body of the embodiments of the invention is not limited to the final driven gear and any member capable of raising the lubricating fluid from the fluid reservoir formed in the first room may be used.

Further, in the above-described embodiment, the partition member is formed by the combination of the protrusion portion 63a of the gasket 63, the wall portion 64b of the duct 64, and the first partition wall rib 62a and the second partition wall rib 62b of the TM-side casing member 62. This is because the process of fixing the partition member is omitted to easily form the lubricating structure.

However, the partition member of the embodiments of the invention is not limited to the above-described configuration and the first room and the second room may be defined by dividing the inner space of the casing. For example, the partition member may be formed as one independent member and may be fixed into the casing by fastening a bolt.

Further, in the above-described embodiment, the differential room DR is formed in a substantially rectangular shape in the plan view and the strainer room SR is formed in a substantially L-shape in the plan view.

However, the shapes of the differential room and the strainer room of the embodiments of the invention are not limited to the above-described shapes and may be a shape in which a communication is performed at an upper portion. For example, the differential room and the strainer room which are line-symmetrical to each other may be defined by dividing the inner space of the casing at the center using one partition member having an opening portion formed at an upper portion.

Further, in the above-described embodiment, the differential room DR and the strainer room SR communicate with each other by the duct 64 disposed to match the traveling direction of the vehicle V.

However, the lubricating structure of the embodiments of the invention is not limited to the above-described configuration and the spaces defined by the partition member may not communicate with each other by the duct.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A power transmission device lubricating structure lubricating a rotation body by immersing the rotation body in a fluid reservoir formed by a lubricating fluid accumulated in a casing of a power transmission device, comprising:
 a strainer which is provided in the casing; and
 a partition member that divides an inner space of the casing,
 wherein the strainer includes a suction port which sucks the lubricating fluid from the fluid reservoir, and
 wherein the partition member divides the inner space of the casing to define a first room accommodating the rotation body and a second room accommodating the strainer while communicating with the first room at an upper portion,
 wherein the suction port is located at a position that is offset relatively to the rotation body in a direction parallel to a rotation center axis of the rotation body,
 wherein the casing includes a plurality of casing members connected to each other at opening edges thereof and a gasket is sandwiched between the casing members,
 wherein the partition member having a thickness direction parallel to the direction of the rotation center axis of the rotation body is formed by the gasket.

2. The power transmission device lubricating structure according to claim 1,
 wherein a wall surface of the partition member between the first room and the second room is formed along a direction parallel to a direction in which the rotation body scrapes the lubricating fluid from the fluid reservoir,
 wherein an upper end portion of the partition member has an concave portion, and the concave portion forms an obtuse angle.

3. The power transmission device lubricating structure according to claim 2,
 wherein the upper end portion of the partition member continuously extends upward from a portion adjacent to the central axis of the rotation body to a portion adjacent to an outer side of the casing.

4. The power transmission device lubricating structure according to claim 1,
 wherein a strainer inlet is at an axially offset position of all of the rotors immersed in the fluid reservoir.

* * * * *